United States Patent

Montjosieu et al.

[11] Patent Number: 6,139,776
[45] Date of Patent: Oct. 31, 2000

[54] ANTI-STATIC AND ANTI-ACID SCALED ADDITIVE FOR POLYMERS

[75] Inventors: Charles Carriere Montjosieu, Chaville; Eric Bouchet, Saint-Laurent-Blangy; Daniel Vasseur, Beaurains, all of France

[73] Assignee: CECA S.A., France

[21] Appl. No.: 09/091,160

[22] PCT Filed: Aug. 2, 1996

[86] PCT No.: PCT/FR96/01234

§ 371 Date: Jun. 6, 1998

§ 102(e) Date: Jun. 6, 1998

[87] PCT Pub. No.: WO97/34949

PCT Pub. Date: Sep. 25, 1997

[30] Foreign Application Priority Data

Mar. 19, 1996 [FR] France ................................. 96 03398
Apr. 26, 1996 [FR] France ................................. 96 05310

[51] Int. Cl.⁷ ................................. C08K 13/02; C08J 3/22
[52] U.S. Cl. ......................... 252/383; 524/910; 524/912; 524/913
[58] Field of Search ........................ 252/383; 524/910, 524/912, 913

[56] References Cited

U.S. PATENT DOCUMENTS

| | | | |
|---|---|---|---|
| 3,266,924 | 8/1966 | Haeske et al. | 106/491 |
| 3,365,437 | 1/1968 | Marra et al. | 524/912 |
| 3,395,137 | 7/1968 | Reindl et al. | 524/910 |
| 3,639,518 | 2/1972 | Davies et al. | 524/910 |
| 3,875,082 | 4/1975 | Finck | 252/383 |
| 3,975,325 | 8/1976 | Long, Jr. | 524/912 |
| 4,314,040 | 2/1982 | Castro et al. | 524/912 |
| 4,417,999 | 11/1983 | Duffy | 252/383 |
| 4,552,687 | 11/1985 | Beacham et al. | 252/500 |
| 4,684,683 | 8/1987 | Ficker et al. | 524/220 |
| 4,764,428 | 8/1988 | Gloyer | 428/402 |
| 4,939,195 | 7/1990 | Ishino et al. | 524/912 |
| 5,252,645 | 10/1993 | Nosu et al. | 524/913 |
| 5,348,995 | 9/1994 | Anderson | 524/910 |

FOREIGN PATENT DOCUMENTS 213788   3/1987   European Pat. Off. .

OTHER PUBLICATIONS

PCT/ISA/210 International Search Report dated Nov. 27, 1996.

Primary Examiner—Ellen M. McAvoy

[57] ABSTRACT

Flaked additive composition for producing stock mixtures of polymers, containing magnesia, MgO, or hydrotalcite, calcium stearate, and N,N-bis(hydroxyethyl)-N-stearylamine, or equivalent compounds.

6 Claims, No Drawings

ANTI-STATIC AND ANTI-ACID SCALED ADDITIVE FOR POLYMERS

FIELD OF THE INVENTION

The present invention refers to formulation ingredients for polymer compositions for molding or extrusion, with the purpose of conferring to them antistatic and antiacid properties.

BACKGROUND OF THE INVENTION

Prior Art

Industry has been using N,N-bis(hydroxyethyl)-N-alkylamines for a long time because of their antistatic properties and, preferably, their $C_{16}$–$C_{20}$ alkyl derivatives, in particular, N,N-bis(hydroxyethyl)-N-stearylamine or the corresponding technical derivatives with a tallow or hydrogenated tallow chain. However, the antiacid function, which assures stability to heat and light of chlorinated polymers or nonchlorinated polymers but which requires halogenated catalysts of the Ziegler type for their polymerization, has been widely based on magnesium oxide (magnesia MgO) and on basic magnesium and aluminum carbonate, hydrotalcite, RN=12304-65-3, $MgCO_3 \cdot 5Mg(OH)_2 \cdot 2Al(OH)_3 \cdot 4H_2O$ (referred to below as HTal), substances the antiacid properties of which are well known and utilized in various fields, for example, in the pharmaceutical field. Therefore, it was desirable to combine these two types of components in one flake additive formulation. When doing this, two types of difficulties are encountered. The first ones relate to the difficulty of producing the flakes on the flaking equipment and the second is the appearance and behavior of the flake-form products.

The additives in question are intended to produce additive/polymer stock mixtures. Their presentation in the form of flakes is very valued. Evidently, these flakes should be able to be melted and be stable at the temperature of manufacture of these stock mixtures, which is hardly any problem. It is also necessary that they do not produce any dust during handling and that they do not agglomerate during somewhat prolonged storage. These are the properties which are more or less needed, in combination with the characteristics required for a correct flake-form product. The simple ethoxylated amines/magnesium oxide and/or hydrotalcite compositions do not satisfy these requirements. The present invention remedies these disadvantages.

We shall recall briefly as to what constitutes a flaking equipment. The device essentially consists of a flaking roll in immediate contact with an inking roll of smaller diameter, which is immersed into a trough in which the product to be flaked is maintained in the molten form, around 80° C. in the case of the additives according to the invention. The inker turns in a direction opposite to the flaker and deposits on it a thin and uniform layer of the product. The flaker is maintained at a temperature 15 to 20° C. below the solidification point of the product to be flaked. A solidified film is formed on it, which is taken off with a doctor blade. The debris is sent to a grinding/lump-breaker system from which the flakes are then directed toward the packaging workshop.

We shall emphasize the following among the most frequent incidents during flaking:

Separation in the Trough:

The physical constituents of the formulation of the additive are separated and the flakes then will no longer be homogeneous. The phenomenon becomes more severe as the time of operation continues and it may lead to stopping the flaking operation.

The Flaking Film Sticks.

The mixture is homogeneous, but the film formed on the flaker is ductile and/or sticking. Scraping becomes defective or impossible. The flakes, even if they form, have a pronounced tendency to form lumps.

Formation of Fines.

Multiple causes. For example, the film formed is too thin because the composition was too fluid, was scraped in plaques and ground into too fine particles. The final product is incorrect, with a tendency of lumping, and above all, unacceptable unhealthiness of the workshop.

Therefore, a flakable composition should have a melting point located between 40 and 80° C. for reasons of flaking, but also because of utilization. In practice, the minimum melting point is set at 44° C. Thus, the low melting point of the ethoxylated amine (39° C. for the hardest one, the ethoxylated amine of hydrogenated tallow) should be compensated which is done by the addition of a mineral filler. It was found, and a part of the invention utilizes this observation, that one cannot harden the mixture at will by increasing the amount of filler. Beyond a certain amount, the molten mixture is no longer homogeneous and separates in the trough or in the inking bath. The flakes will then no longer have a homogeneous composition; they will form an island of waxy material with an excess of ethoxylated amine and become sticky. Thus, there is a practical limit to the amount of filler, which is around 15% by weight. In the additives of the invention, this role of the filler, to be active toward hydrochloric acid, is assigned to the magnesium hydroxide or to the hydrotalcite. It is found that, from this point of view, these substances are particularly difficult to use and, in order to assure homogeneity of the formulation, it is necessary to include a stabilizer, which evidently should be compatible with the polymers. This necessitates an additive for making the stock mixtures moldable or extrudable. Calcium stearate is used for this purpose. Here, one is again limited to an amount which should be below 25% of the stearate or otherwise the flakes become sticky.

DESCRIPTION OF THE INVENTION

The compositions according to the invention are thus flaked compositions containing:

5 to 15% of magnesium oxide and/or hydrotalcite 10 to 25% of calcium stearate

N,N-bis(hydroxyethyl)-N-stearylamine or its industrial equivalent, N,N-bis(hydroxyethyl)-N-(hydrogenated tallow) amine to make up to 100%.

Different variations of the formulations are also part of the invention: those which result from the partial or complete replacement of calcium stearate by zinc stearate or magnesium stearate; those which result from the replacement of the MgO or hydrotalcite up to 50% by another mineral filler, for example, alumina, preferably calcined and ground, or by titanium dioxide ($TiO_2$), which brings the pigment function to the formulation, or by barium sulfate ($BaSO_4$), to increase the density. In the additive formulations for polymers, currently ethylene bis-stearamide (EBS) is used; although this is an organic constituent, since its melting point is very high (m.p.≈140° C.), this component can be integrated in the basic formula replacing up to 50% of the magnesium oxide or hydrotalcite.

EXAMPLES

The following examples will illustrate the invention. As the N,N-bis(hydroxyethyl)-N-(hydrogenated tallow) amine, Noramox®SH2 of CECA S.A. is used, abbreviated below as NoxSH2. Calcium stearate is abbreviated as CaSt. The compositions are given in weight percent.

Example 1

Base Formula

A base formula according to the invention containing the N,N-bis(hydroxyethyl)-N-(hydrogenated tallow) amine, calcium stearate and hydrotalcite (F1) or magnesia MgO (F2) with variations by partial replacement of the hydrotalcite by titanium dioxide or ethylene bis-stearamide (F3, F4) and the corresponding comparison formulas in which the calcium stearate is absent, were compared. These compositions are given in the Table below.

| Composition | F1 | F2 | F3 | F4 | F'1 | F'2 | F'3 | F'4 |
|---|---|---|---|---|---|---|---|---|
| NoxSH2 | 65 | 65 | 65 | 65 | 87 | 87 | 87 | 87 |
| CaSt | 22 | 22 | 22 | 22 | | | | |
| HTal | 13 | | 7 | 7 | 13 | | 7 | 7 |
| MgO | | 13 | | | | 13 | | |
| TiO$_2$ | | | 6 | | | | 6 | |
| EBS | | | | 6 | | | | 6 |

The compositions F1, F2, F3, F4 are brittle, without fines, they are not sticky and melt around 45° C. (although the melting is difficult to read in the Maquenne block, because, in the absence of any mechanical perturbation, the molten product retains its initial flaky form). Formulations F'1, F'2, F'3, F'4 are flakes, which also melt around 45° C., but have a heterogeneous appearance, are ductile or even have a rubbery appearance and stick together. Thus, the necessary presence of the stabilizing stearate is well evidenced.

Example 2

| Formulations made heavy with barium sulfate | | | |
|---|---|---|---|
| Composition | F5 | F'5 | F"5 |
| NoxSH2 | 65 | 87 | 60 |
| CaSt | 22 | | 20 |
| HTal | 7 | 7 | 10 |
| BaSO$_4$ | 6 | 6 | 10 |

Composition F5 according to the invention is in the form of brittle flakes without fines. The composition F5, which does not contain stearate, is impossible to keep homogeneous in the molten phase in the trough of the flaking equipment. The barium sulfate separates and the resulting flakes are heterogeneous, sticky and form lumps. The formula F"5, which is too rich in mineral filler, is impossible to flake.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Flaked composition with an anti-static and anti-acid additive for polymers, consisting essentially of, by weight, 5 to 15% of magnesia MgO or hydrotalcite;

10–25% of calcium stearate or magnesium stearate or mixtures thereof; and

N,N-bis(hydroxyethyl)-N-stearylamine or its industrial equivalent, N,N,-bis(hydroxyethyl)-N-(hydrogenated tallow)amine to 100%.

2. Composition according to claim 1, wherein optionally up to 50% of the magnesia MgO or hydrotalcite includes titanium dioxide.

3. Composition according to claim 1, wherein optionally up to 50% of the magnesia MgO or hydrotalcite includes ethylene bis-stearamide.

4. Composition according to claim 1, wherein optionally up to 50% of the magnesia MgO or hydrotalcite includes alumina.

5. Composition according to claim 1, wherein optionally up to 50% of the magnesia MgO or hydrotalcite includes barium sulfate.

6. Flaked composition with an antistatic and antiacid additive for polymers, consisting essentially of, by weight, 5–15% of mixtures of magnesia MgO or hydrotalcite, wherein up to 50% of the magnesia MgO or hydrotalcite includes a compound selected from the group consisting of titanium dioxide, ethylene bis-stearamide, alumina and barium sulfate;

10–25% of calcium stearate or magnesium stearate or mixtures thereof; and

N,N-bis(hydroxyethyl)-N-stearylamine or its industrial equivalent, N,N,-bis(hydroxyethyl)-N-(hydrogenated tallow)amine to 100%.

* * * * *